United States Patent
Li et al.

(10) Patent No.: US 8,920,993 B2
(45) Date of Patent: Dec. 30, 2014

(54) ANODE PROTECTION SYSTEM FOR SHUTDOWN OF SOLID OXIDE FUEL CELL SYSTEM

(71) Applicant: Delphi Technologies, Inc., Troy, MI (US)

(72) Inventors: Bob X. Li, Grand Blanc, MI (US);
Malcolm J. Grieves, Fairport, NY (US);
Sean M. Kelly, Pittsford, NY (US)

(73) Assignee: Delphi Technologies, Inc, Troy, MI (US)

( * ) Notice: Subject to any disclaimer, the term of this patent is extended or adjusted under 35 U.S.C. 154(b) by 50 days.

(21) Appl. No.: 13/714,664

(22) Filed: Dec. 14, 2012

(65) Prior Publication Data

US 2014/0170513 A1   Jun. 19, 2014

(51) Int. Cl.
*H01M 8/04* (2006.01)

(52) U.S. Cl.
CPC . *H01M 8/04* (2013.01); *Y02E 60/50* (2013.01)
USPC .......................................................... 429/429

(58) Field of Classification Search
CPC .................. Y02E 60/50; Y02E 60/525; H01M 2008/1293; H01M 8/2425; H01M 8/04753; H01M 8/04776; H01M 8/04373
USPC .......................... 429/410, 415, 416, 425, 429
See application file for complete search history.

(56) References Cited

U.S. PATENT DOCUMENTS

2008/0248353 A1\* 10/2008 Grieve et al. ..................... 429/26
2011/0059377 A1\* 3/2011 Scotto et al. ................... 429/416

\* cited by examiner

*Primary Examiner* — Stewart Fraser
(74) *Attorney, Agent, or Firm* — James M. Chan (57) ABSTRACT

An Anode Protection Systems for a SOFC system, having a Reductant Supply and safety subsystem, a SOFC anode protection subsystem, and a Post Combustion and slip stream control subsystem. The Reductant Supply and safety subsystem includes means for generating a reducing gas or vapor to prevent re-oxidation of the Ni in the anode layer during the course of shut down of the SOFC stack. The underlying ammonia or hydrogen based material used to generate a reducing gas or vapor to prevent the re-oxidation of the Ni can be in either a solid or liquid stored inside a portable container. The SOFC anode protection subsystem provides an internal pressure of 0.2 to 10 kPa to prevent air from entering into the SOFC system. The Post Combustion and slip stream control subsystem provides a catalyst converter configured to treat any residual reducing gas in the slip stream gas exiting from SOFC stack.

16 Claims, 7 Drawing Sheets

ANODE PROTECTION SYSTEM FOR SHUTDOWN OF SOLID OXIDE FUEL CELL SYSTEM

GOVERNMENT-SPONSORED STATEMENT

This invention was made with the United States Government support under Contract DE-FC-26-08NT-0003894 awarded by the U.S. Department of Energy. The Government has certain rights in this invention.

TECHNICAL FIELD OF INVENTION

The present disclosure is related to a solid oxide fuel cell system; more particularly, a system for the protection of the anode of a solid oxide fuel cell.

BACKGROUND OF INVENTION

Fuel cells are used to produce electricity when supplied with fuels containing hydrogen and an oxidant such as air. A typical fuel cell includes an ion conductive electrolyte layer sandwiched between a cathode layer and an anode layer. There are several different types of fuel cells known in the art, one of which is a solid oxide fuel cell (SOFC). SOFCs are regarded as a highly efficient electrical power generator that produces high power density with fuel flexibility and are used in Auxiliary Power Units (APU) to convert hydrocarbon fuels into electrical energy to provide electrical power for stationary or on-board vehicles.

In a typical SOFC, air is passed over the surface of the cathode layer and a reformate hydrocarbon fuel is passed over the surface of the anode layer opposite that of the cathode layer. Oxygen ions from the air diffuse from the cathode layer through the dense electrolyte to the anode layer in which the oxygen ions reacts with the hydrogen and carbon monoxide in the fuel, forming water and carbon dioxide; thereby, creating an electrical potential between the anode layer and the cathode layer. The electrical potential between the anode layer and the cathode layer is typically about 1 volt and power around 1 $W/cm^2$. Multiple SOFCs are stacked in series to form a SOFC stack having sufficient power output for commercial applications.

The anode acts as a catalyst for the oxidation of hydrocarbon fuels and has sufficient porosity to allow the transportation of the fuel to and the products of fuel oxidation away from the anode/electrolyte interface, where the fuel oxidation reaction takes place. The anode of a typical SOFC is typically formed of a nickel/yttria-stabilized zirconia (Ni/YSZ) composition in which the nickel is in the form of nickel oxide (NiO). The use of nickel in the anode is desirable for its abilities to be a catalyst for fuel oxidation and current conductor. After the SOFC stack is initially assembled from a plurality of SOFCs, a fuel gas comprising primarily of hydrogen gas is passed over the anodes of the SOFCs at elevated temperatures to reduce the NiO in the anodes into substantially metallic nickel (Ni).

SOFC stacks are typically operated at above 700° C. and the nickel in the anode remains in its reduced form Ni due to the continuous supply of primarily hydrogen fuel gas. However, if the supply of fuel gas is lost during a controls upset, malfunction, or sudden fuel cut-off, the Ni in the anode of the SOFC may undergo a re-oxidation, where the Ni reacts with the oxygen in the air diffused from the cathode layer or introduced into the anode chamber to form NiO at temperatures above approximately 350° C. The formation of NiO in the microstructure of the anode results in volumetric expansion of the anode layer, which exerts stress on the overall SOFC structure. Repeated nickel oxidation and reduction may cause delamination or cracking of the electrolyte of the SOFC.

In a laboratory setting, the SOFC stack may be protected from re-oxidation using a supply of reducing gas, which is typically a dilute mixture of hydrogen in nitrogen gas. This can be used to purge the anode chamber during SOFC shutdown or standby conditions to prevent anode re-oxidation. A typical SOFC stack requires usually between four to twelve hours cooling from its operating temperature to a temperature below which there is no significant damage to the anode material can occur. During this time, it will require a large amount of purging gas and frequent bottle changes to meet the reducing gas consumption demand; therefore using compressed reducing gas system on a mobile system, especially onboard a vehicle, is impractical.

There is a need for a system to protect the integrity of the SOFC during shutdown operation of the SOFC stack in an APU onboard a vehicle. There is a further need for a system to prevent the oxidation of nickel in the anode layer of the SOFC during periods of prolong shut down. There is still a further need for this system to be portable and economical to install and operate.

SUMMARY OF THE INVENTION

An embodiment of the present disclosure is a SOFC Anode Protection Systems (APS) for a SOFC system. The APS protects the integrity of the SOFC during shutdown or standby operation of the SOFC stack by preventing the re-oxidation of the Ni in the anode layer of the SOFC, as well as being sufficiently portable to be used in a mobile vehicle and cost economical to operate. The APS comprises three subsystems that include a Reductant Supply and Safety Subsystem (Subsystem A), a SOFC Anode Protection Subsystem (Subsystem B), and a Post Combustion and Slip Stream Control Subsystem (Subsystem C).

The Reductant Supply and Safety Subsystem includes means for generating a reducing gas or vapor to protect the SOFC by prevent re-oxidation of the Ni in the anode layer. The means are sufficiently portable for use in an Auxiliary Power Unit (APU) on board a stationary or mobile vehicle. The underlying based material used to generate a reducing gas or vapor to prevent the re-oxidation of the Ni can be in either a solid or liquid stored inside a portable container. The reducing gas or vapor can be either ammonia based or hydrogen based.

The SOFC Anode Protection Subsystem provides a relatively small positive internal pressure, such as about 0.2 to 10 kPa above ambient is sufficient to prevent air entering into the system. The Post Combustion and Slip Stream Control Subsystem provides a catalyst converter configured to treat any residual reducing gas in the slip stream gas exiting from SOFC stack.

Further features and advantages of the invention will appear more clearly on a reading of the following detailed description of an embodiment of the invention, which is given by way of non-limiting example only and with reference to the accompanying drawings.

BRIEF DESCRIPTION OF DRAWINGS

The present invention may best be understood from the following detailed description of the preferred embodiments illustrated in the drawings, wherein.

DETAILED DESCRIPTION OF INVENTION

Figure 1:
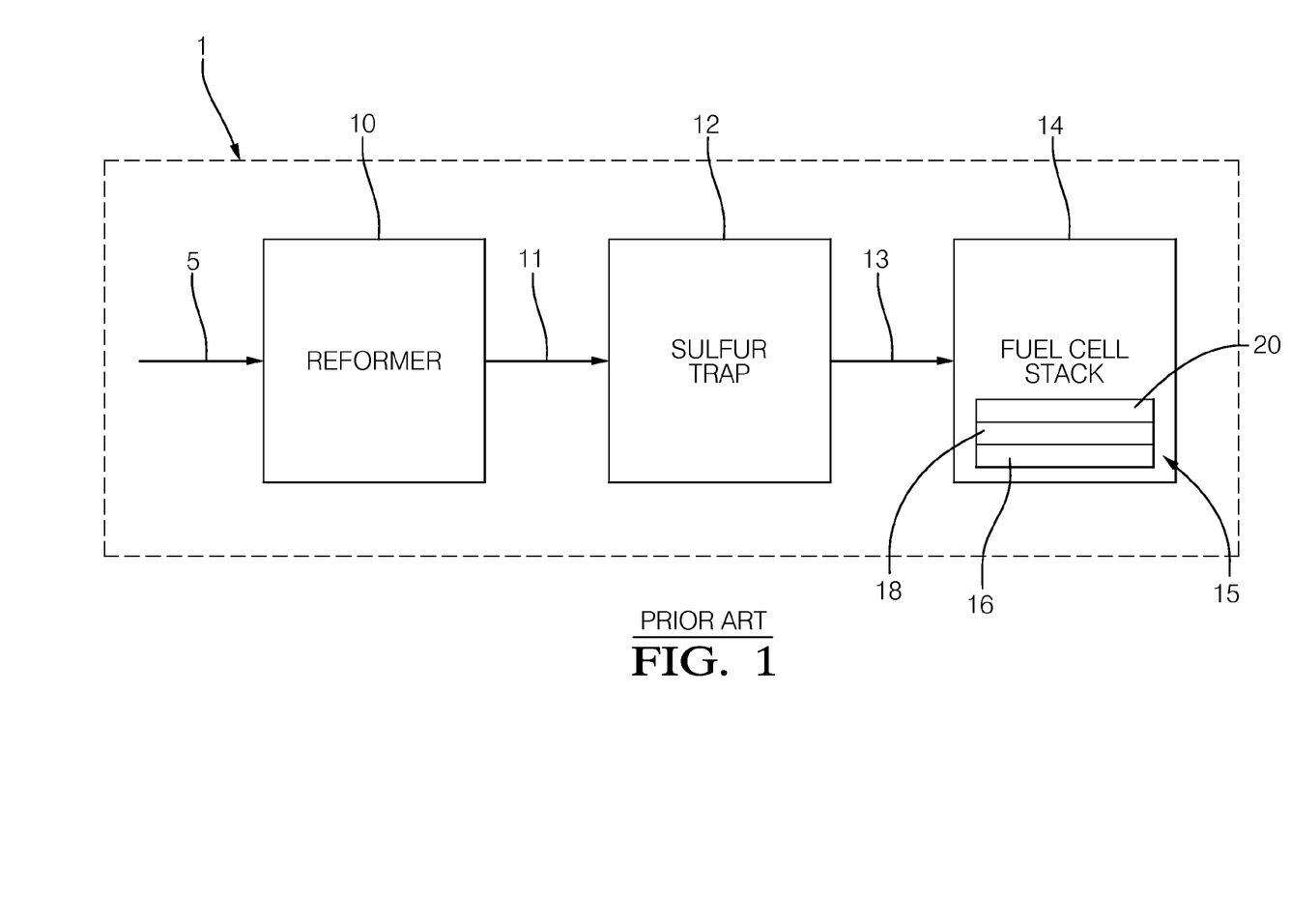
FIG. 1 shows a typical prior art SOFC system having a reformer, a sulfur trap, and a SOFC stack.

Shown in FIG. 1 is a typical solid oxide fuel cell (SOFC) system 1 known in the art. The SOFC system 1 includes a reformer 10, an optional desulfurizer 12, and a SOFC stack 14. The SOFC stack 14 includes a plurality of SOFC 15, wherein each SOFC 15 includes an anode layer 16, a cathode layer 20, and an electrolyte layer 18 sandwiched between the anode layer and cathode layer. The reformer 10 is typically of that of a catalytic hydrocarbon reformer that receives a hydrocarbon fuel stream 5 and produces fuel gas that includes hydrogen. The hydrocarbon fuel stream 5 may be that of gasoline, diesel, natural gas, jet fuel, kerosene, alcohol, ether, ammonia, or the likes. The three types of reformer technologies that are typically employed in conjunction with the SOFC system 1 are endothermic reformers using water or high recycle as inputs, autothermal reformers using partial air and partial recycle as inputs, and partial oxidation reformers using air an input. The reformer 10 takes the fuel stream 5 to produce a reformate stream 11 that feeds the SOFC stack 14. If sulfur is present in the reformate stream 11, a desulfurizer 12 may be utilized to produce a reduced sulfur or sulfur free reformate stream 13 to the SOFC stack 14.

Figures 2, 3:
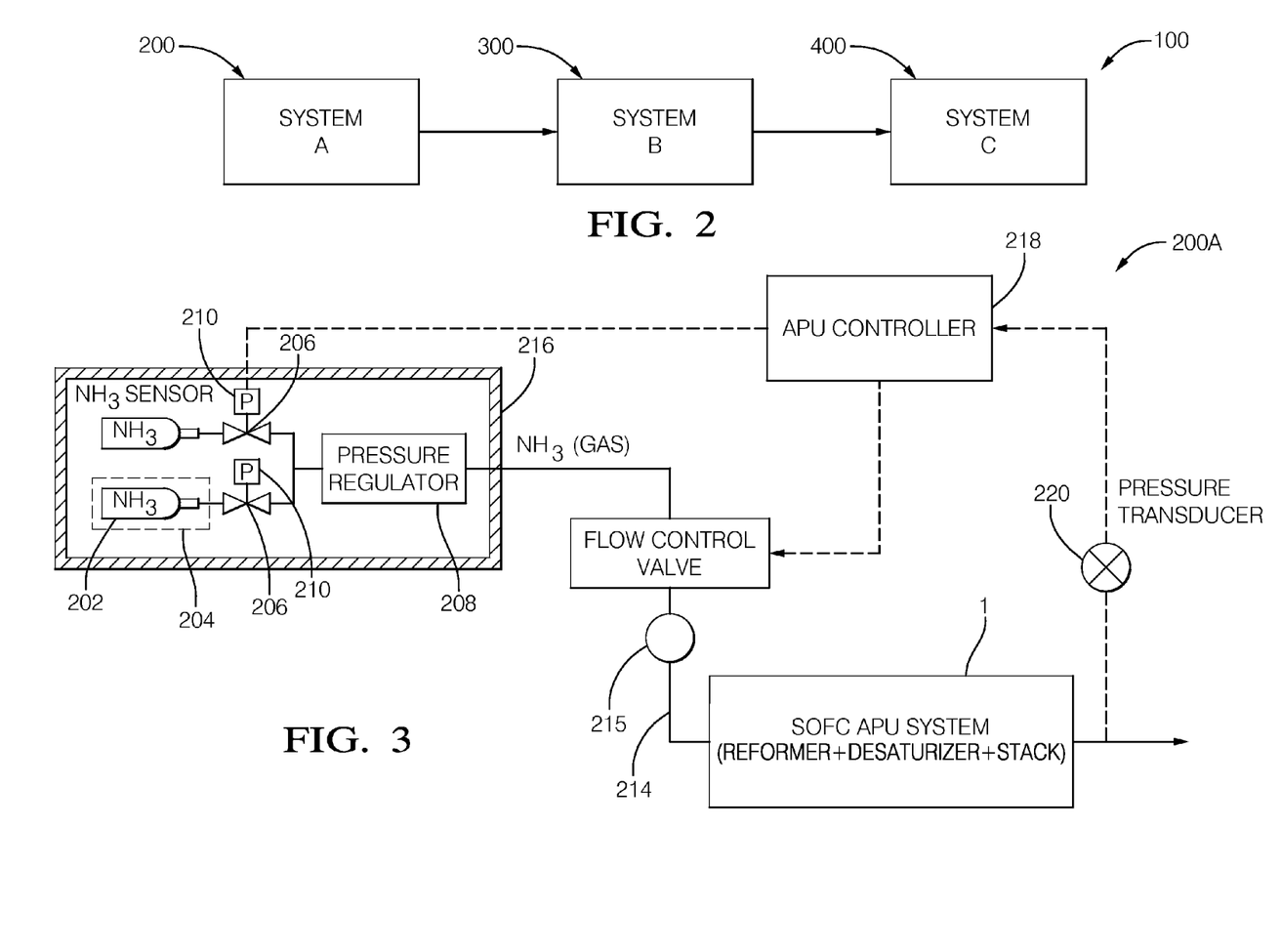
FIG. 2 shows a general arrangement of the subsystems for an embodiment of a SOFC Anode Protection Systems (APS).
FIG. 3 shows an embodiment of a Reductant Supply and Safety Subsystem generating a reducing gas of ammonia gas by using liquid anhydrous ammonia.

Shown in FIG. 2 is a general arrangement of a SOFC Anode Protection Systems (APS) 100 for a SOFC system 1. The APS 100 protects the integrity of the SOFC during shutdown or standby operation of the SOFC stack 14 by preventing the oxidation of the Ni in the anode layer of the SOFC, as well as being sufficiently portable to be used in a mobile vehicle and economical to install and operate. The APS 100 comprises three subsystems that include a Reductant Supply and Safety Subsystem (Subsystem A) 200, a SOFC Anode Protection Subsystem (Subsystem B) 300, and a Post Combustion and Slip Stream Control Subsystem (Subsystem C) 400.

Reductant Supply and Safety Subsystem—Subsystem A

The Reductant Supply and Safety Subsystem 200 includes means to generate a reducing gas or vapor to protect the SOFC by preventing re-oxidation of the Ni in the anode layer during the course of normal or a sudden shut down of the SOFC stack 14. The means are sufficiently portable for use in an Auxiliary Power Unit (APU) on board a stationary or mobile vehicle. The underlying based material used to generate a reducing gas or vapor to prevent the re-oxidation of the Ni can be in either a solid or liquid state stored inside a replaceable or replenishable container. The reducing gas or vapor may be either ammonia based or hydrogen based.

Ammonia based reducing gas or vapor may be generated from a liquid ammonium containing materials, such as anhydrous ammonia or liquid urea such as AdBlue®, which is a high purity 32.5% urea solution manufactured by BASF. Ammonia based reducing gas or vapor may also be generated from a solid ammonium containing materials such as ammonium salts, including ammonium carbamate, ammonium carbonate, solid urea, and guanidine. Ammonia based reducing gas or vapor may also be generated from an ammonia storing material such as complex compounds that can store ammonia by absorption, such as calcium chloride, strontium chloride, and magnesium chloride.

The solid ammonia containing material may be heated in a sealed container at an effective temperature such that the ammonia containing material is decomposed into ammonia and carbon dioxide gases pressurizing the container. By controlling the amount of heat applied to the material and the pressure within the container by the varying the flow rate of gas extracted from the sealed container, equilibrium conditions may be achieved for the desired gas decomposition rate. Similarly, the ammonia storing material may be heated in a sealed container at an effective temperature to develop the pressure for the desired flow rate.

Shown in FIG. 3 is an embodiment of a Reductant Supply and Safety Subsystem A 200 generating a reducing gas of ammonia gas by using liquid anhydrous ammonia. Using ammonia as a reducing gas has the advantage of increased gas capacity due to the effect of nickel catalytic reaction of converting ammonia into hydrogen and nitrogen gases. Liquid anhydrous ammonia may be used for the production of ammonia gas on board a vehicle. The Reductant Supply and Safety Subsystem includes two anhydrous ammonia storage cylinders 202 having double walls with ammonia absorption protecting foam 204 inside a secure enclosure, two electrically actuated valves 206 for opening or closing gas flow to each cylinder 202, a pressure regulator valve assembly 208 to reduce gas pressure to a required level for delivering ammonia gas to the SOFC system 1, two pressure transducers 210 to monitoring internal pressure of the cylinders 202 and signaling the switching of the cylinder 202, and acting as a reminder of replacing empty cylinder 202 as one is consumed, a flow control valve 212 to control the flow rate of ammonia gas delivery, and a gas line 214 connecting the cylinders 202 to the SOFC system 1.

The shut off valve 206 is mounted adjacent to the cylinder gas exit and protected within a safe enclosure 216. During an impact to the APU system in a vehicle accident, a sensor signal can be sent to the shut off valve 206 to close the cylinders gas outlet, thus, preventing ammonia further flow through the piping to the SOFC system 1. An optional ammonia decomposition catalyst 215 can be included for converting ammonia to hydrogen and nitrogen gases. This catalyst 215 may be electrically or thermally heated. An ammonia safety sensor may be used inside the enclosure to monitor ammonia leakage.

During shutdown of the SOFC system, an electric signal is sent from an APU controller 218 to the Reductant Supply and Safety Subsystem 200A to start gas flow from one cylinder 202. The pressure sensor 220 is used to monitor the back pressure of the SOFC anode chamber and the signal is feedback to flow control valve 212 for flow on demand control. The advantage of this system is simple mechanization, fast response, constant ammonia pressure inside the cylinder 202 from full to empty allowing good flow control, and no major electric power requirement other than minimum power requirement for sensors and control operations.

Figure 4:
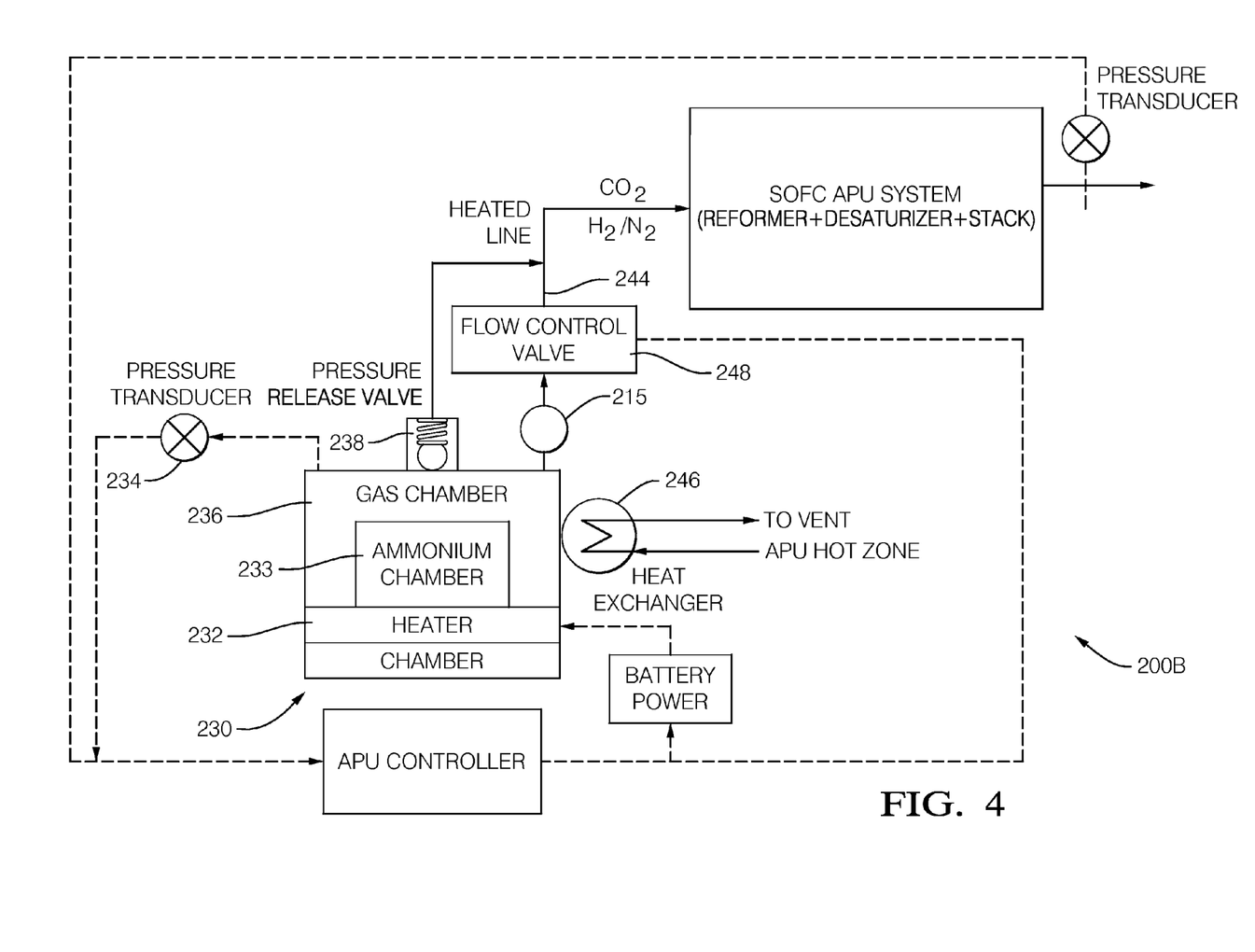
FIG. 4 shows an alternative embodiment of the Reductant Supply and Safety Subsystem generating a reducing gas of ammonia gas mixture by decomposition of a solid ammonia containing materials such as ammonium carbamate.

Shown in FIG. 4, is alternative embodiment of the Reductant Supply and Safety Subsystem 200B to generate the required ammonia gas by decomposition of a solid ammonia containing materials, such as ammonium salts (ammonium carbamate, ammonium carbonate, etc.), solid urea, guanidine or ammonia complex compounds where ammonia is absorbed in (calcium chloride, strontium chloride, magnesium chloride, etc.).

Solid ammonium carbamate, a crystal powder material, can be compressed into a high density block or solid cartridge to increase the material packaging capacity. At temperature above 60 degree ° C., ammonium carbamate sublimation occurs to produce ammonia and carbon dioxide gases. The advantage of using ammonium carbamate is that the material is relatively safe to handle in a solid form, and easy to decompose upon heating. One mole of ammonium carbamate can be decomposed into two mole ammonia and one mole carbon dioxide. With nickel acting as catalyst inside the anode chamber, two moles of ammonia further decompose into three mole hydrogen and one mole nitrogen gases. With ammonium carbamate powder compressed into a solid block or cartridge doubling its density, the volumetric efficiency of using carbamate as the ammonia generating source material is greatly increased. An ammonia gas generating mechanization using ammonium carbamate as anode protection gas is shown in FIG. 4.

Crystal ammonium carbamate, or Ammonium carbamate crystals compressed into a solid cartridge 233 as an option, is loaded inside a metal ammonium reactor 230. The ammonium reactor 230 is designed to suit for heat conductivity and environment temperature. The reactor 230 is filled with the carbamate and the sizing of the reactor 230 is set to accommodate several cycles per year anode protection gases requirement. At the bottom of the reactor 230, an electric resistance heater 232 is placed to heat the reactor 230, as well as the carbamate. The carbamate may be gravity fed for simple mechanical function. A pressure sensor 234 is mounted on the gas chamber 236 to monitor chamber pressure, and the signal is used for closed loop control on the heater 232. A temperature sensor (not shown) is integrated to the heater 232 to monitor the temperature of the device. A pressure relief valve 238 is used to protect gas chamber 236 from over pressure damage. A flow control valve 248 is used to regulate required gas flow to the anode chamber, and can be controlled by the anode chamber back pressure sensor 242, working with check valve in a closed loop control (flow on demand). The carbamate reactor 230 is in fluid communication with the SOFC gas inlet port through gas line 244. The gas line 244 is thermally managed to prevent decomposed ammonia and carbon dioxide gases re-solidification, thus plugging the system. An optional electric resistive heater can be used to heat an ammonia decomposition catalyst to decompose ammonia to hydrogen and nitrogen gas to prevent gases re-solidification if it is needed. To reduce power consumption, waste heat from solid oxide fuel cell operation can be routed to the anode protection gas generation reactor and thermal managing the gas delivery line in place of the heated line. The reactor can be in direct contact with the hot wall of APU or packaged inside a controlled heat zone for better utilization of the waste heat. The waste heat can also be piped to the reactor through heat exchanger mechanization 246.

During a SOFC shutdown or standby event, either a controlled normal shutdown, emergency stop, or any out of fuel gas cases, a signal triggers to start APS ammonia generation operation. If required to increase pressure, the heater 232 starts to operate causing ammonium carbamate to decompose to ammonia and carbon dioxide gases pressuring the gas chamber 236. The gas control valve 248 is commanded to flow when the gas chamber 236 pressure reaches a pre-set pressure to ensure smooth gas delivery and there is a demand for flow from SOFC pressure sensor. This process continues until the stack temperature lowering to a pre-determined temperature, for example approximately 350° C., then, APS reactor stops operation, the stack cools off to room temperature passively.

Another alternative embodiment may include an absorbent to store ammonia in a solid material, such as metal ammine chlorides. When the demand for using ammonia occurs, stored ammonia is released from the sorbent upon heating. The "consumed" bottle, having metal chloride remaining, may then be recharged with ammonia at service stations for renewed use. This method is more secure for use compared to direct anhydrous ammonia cylinder approach. The other advantage of this ammonia absorption system is that there is no additional thermal managed line required to prevent gas re-solidification during transportation in the gas line as seen in the ammonia salt system.

Where a hydrogen based gas is used, hydrogen based reducing gas or vapor can be generated from liquid hydrogen containing materials, such as cryogenic liquid hydrogen, alcohols (methanol, ethanol, etc.), E85, ethers (Dimethyl ether, etc.), hydrocarbons (methane, propane, etc.), or solid hydrogen containing materials, such as metal hydrides. To extract hydrogen gas from these hydrogen containing materials, heat is applied to the compound for either direct hydrogen production or through a vaporization process to vaporize the compound and flow through a catalyst to break down hydrocarbon bond to form hydrogen gas through catalytic reaction.

Figure 5:
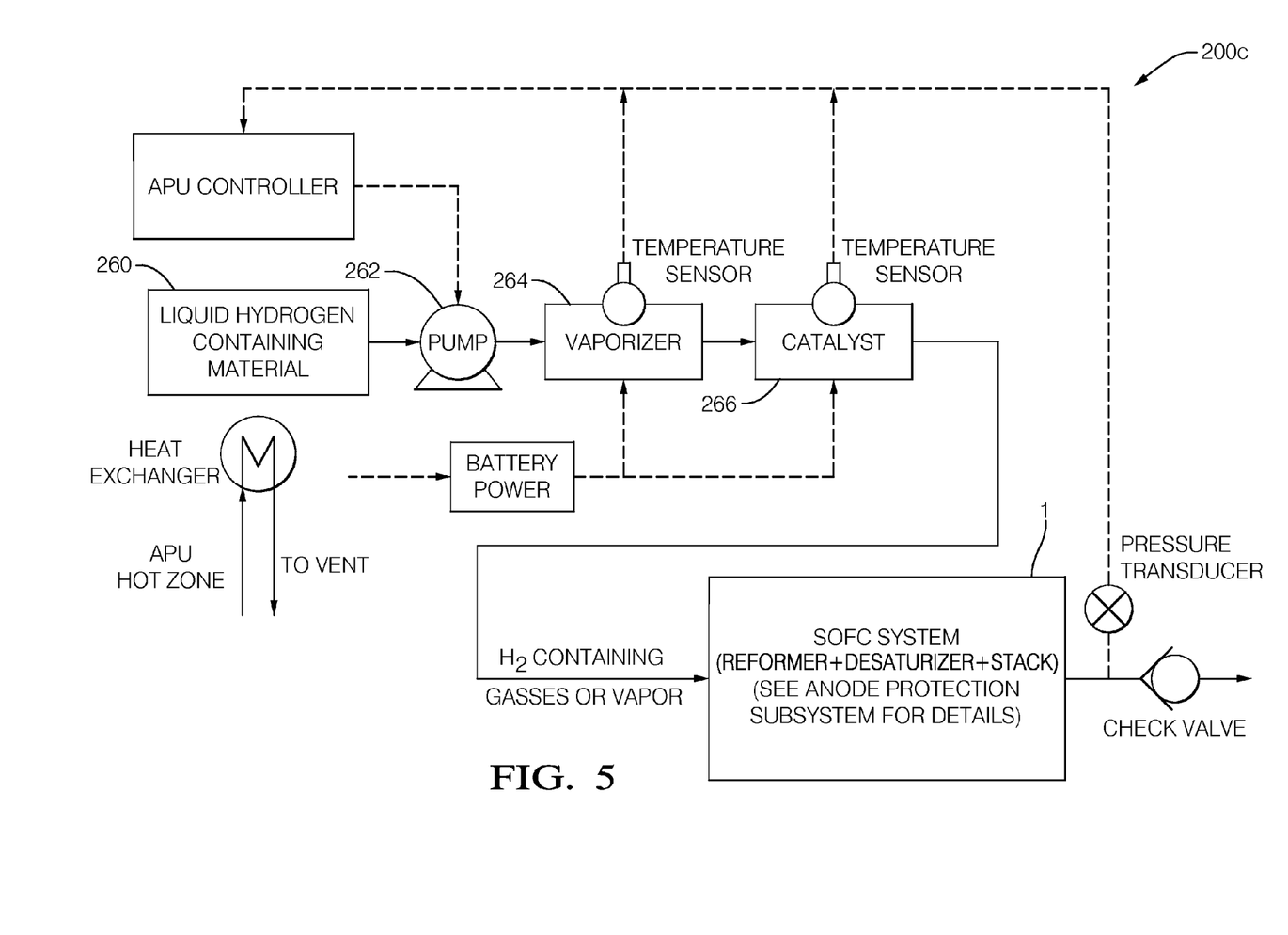
FIG. 5 shows an alternative embodiment of the Reductant Supply and Safety Subsystem generating a reducing gas of hydrogen gas mixture by using a liquid based hydrogen containing material such as methanol or dimethyl ether.

FIG. 5 shows a Reductant Supply and Safety Subsystem 200C using liquid based hydrogen containing material, such as alcohols, E85, ethers, diesel fuel, etc. to generate hydrogen containing gas. A container 260 with liquid based hydrogen containing material inside is connected to a pump 262. The pump 262 meters the precise amount of fluid through a vaporizer 264 to vaporize the fluid. Vaporized fluids pass through a catalytic converter 266 to produce hydrogen gas and injected into the SOFC anode chamber.

Figure 6:
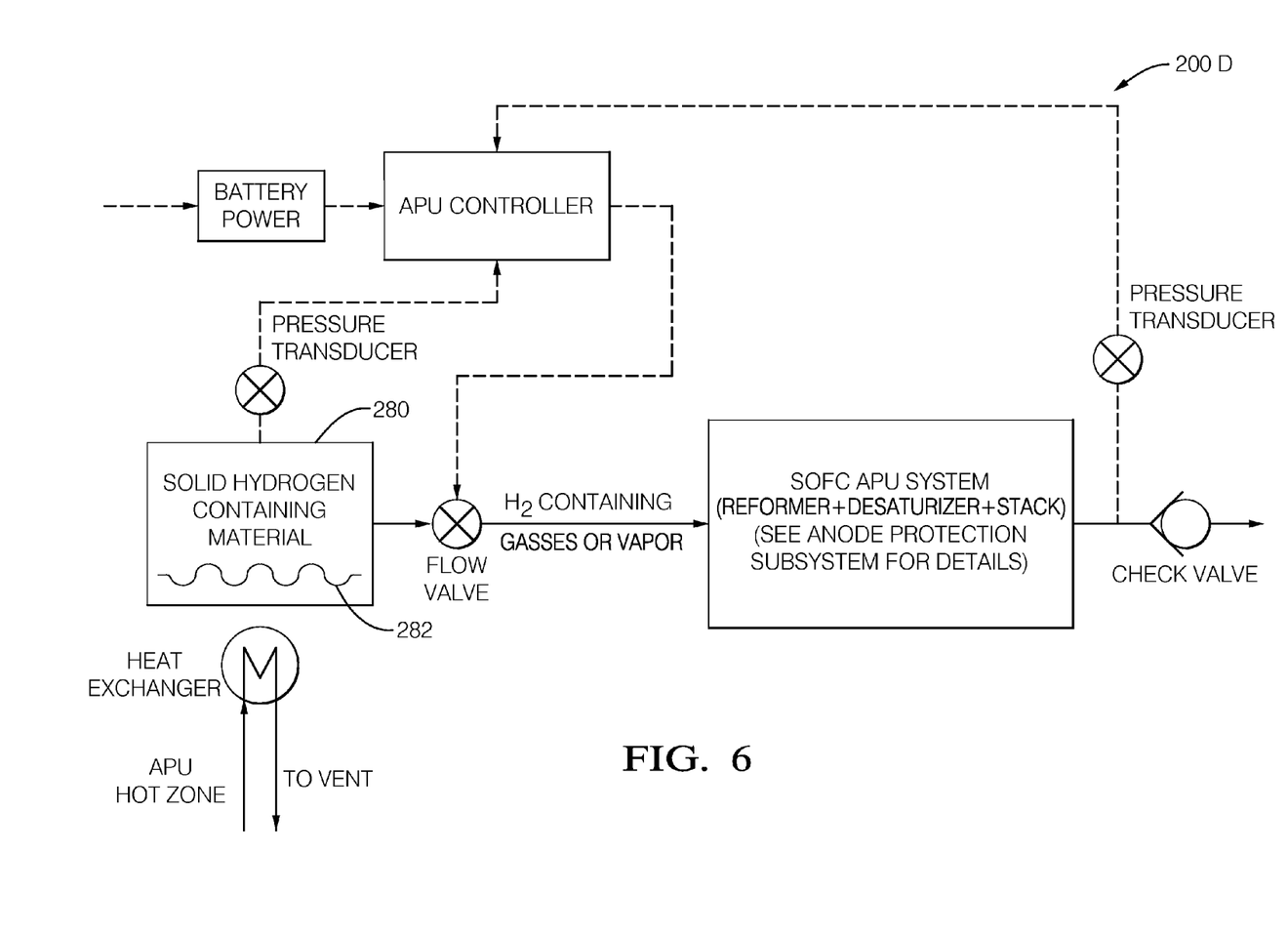
FIG. 6 shows an alternative embodiment of the Reductant Supply and Safety Subsystem generating a reducing gas of hydrogen gas mixture by using a solid based hydrogen containing material.

FIG. 6 shows Reductant Supply and Safety Subsystem 200D using solid based hydrogen containing material, such as metal hydrides to generate hydrogen containing gas. Hydrogen is stored in a solid material and contained inside a metal cylinder 280. A thermal layer of flexible material (heater) 282 can be wrapped around the cylinder 280 to control temperature for the optimum hydrogen delivery.

SOFC Anode Protection Subsystem—Subsystem B

Figure 7:
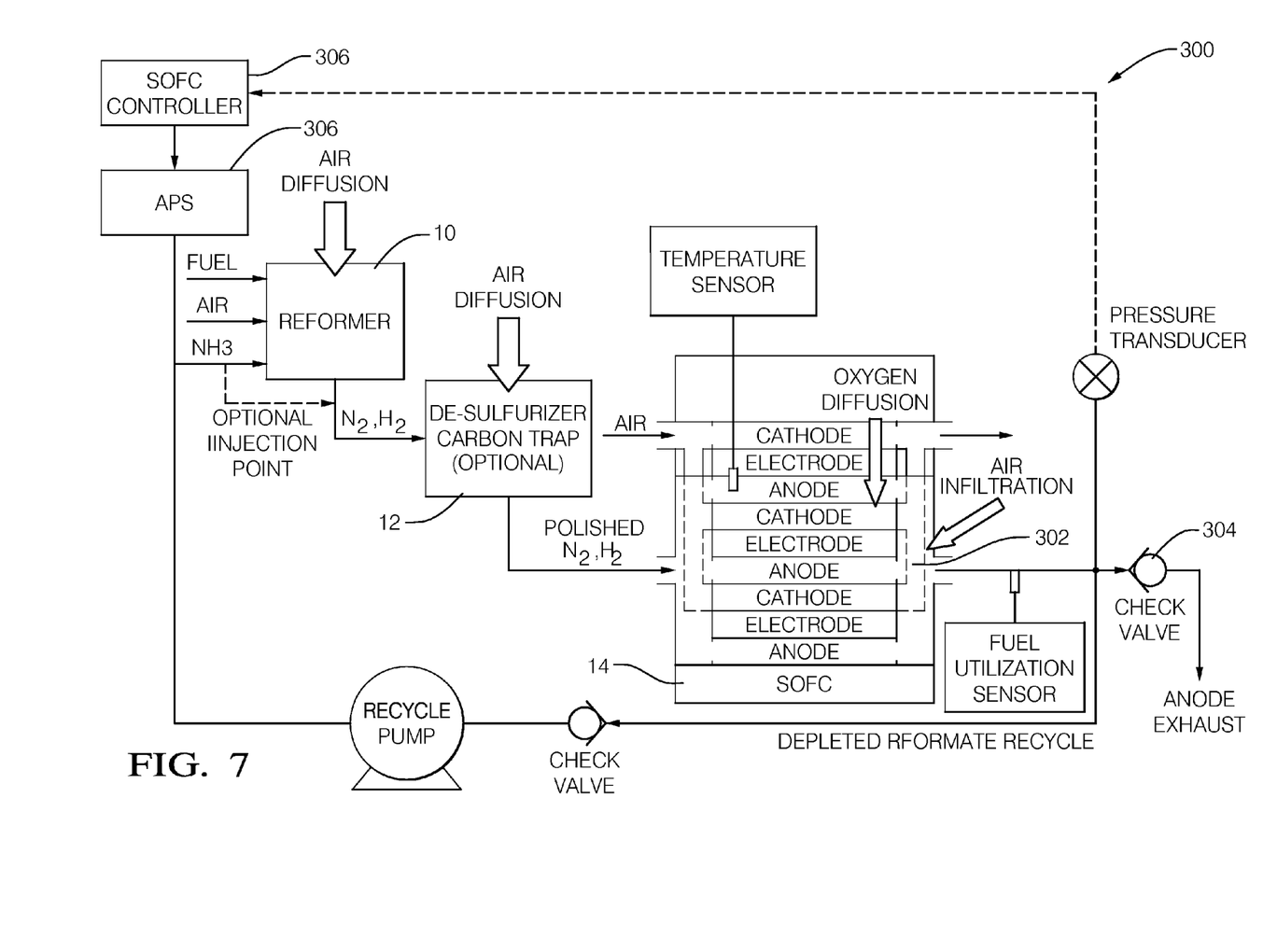
FIG. 7 shows a SOFC system having an APS.

FIG. 7 shows SOFC system mechanization with an Anode Protection Subsystem 300. Although a SOFC system 1, having a reformer 10, desulfurizer 12, and SOFC stack 14, has a sealed internal gas passage 302, as well as a check valve 304 at its end, to prevent ambient air from entering the system, the SOFC stack 14 still may have several potential air leak sources. External ambient air may enter the system from the reformer 10, desulfurizer 12, or SOFC stack 14. Internal oxygen ion diffusion can occur from the SOFC cathode chamber migrating to anode chamber. With a relatively good sealing system, only a small amount of reducing gas is required to be introduced into the SOFC stack to protect Ni in the anode of the SOFC from oxidation. A small positive internal pressure, such as 0.2~10 kPa above ambient is sufficient to prevent air entering into the system. The reducing gas generated from the Reductant Supply and Safety Subsystem is preferably injected into the SOFC system in front of the reformer 10. The reducing gas flows through the reformer 10, desulfurizer 12, and SOFC stack 14. The advantage of this injection is to take the advantage of the catalyst in the reformer 10, which helps disassociate the ammonia into hydrogen and nitrogen gas. An alternative is to inject the reducing gas after the reformer 10 and before the desulfurizer 12. A small portion of the reducing gas may leak through the check valve 304 into the atmosphere. This reducing gas needs to be treated before being emitted to the air. An optional fuel utilization sensor, such as a rich biased electrochemical sensor which infers equivalence ratio based on oxygen partial pressure, can be installed at the fuel recycling line to monitor and control amount of injection as well. As SOFC fuel stoppage occurs, the SOFC controller 306 sends the control signal to start APS operation. The APS controller monitors the SOFC anode chamber temperature through a temperature sensor and the system pressure through a pressure sensor to control the start and stop operation of the APS. During APS operation, air can flow through the SOFC stack cathodes to accelerate stack cooling, thus reduce the amount of APS reducing gas material consumption. Hot air exiting from stack cathode is mixed with anode protective gas exiting from stack to dilute anode protective gas, preventing anode protective gas re-solidification and adding air to the gas stream for post combustion anode slip treatment.

Post Combustion and Anode Slip Control Subsystem—Subsystem C

Figure 8:
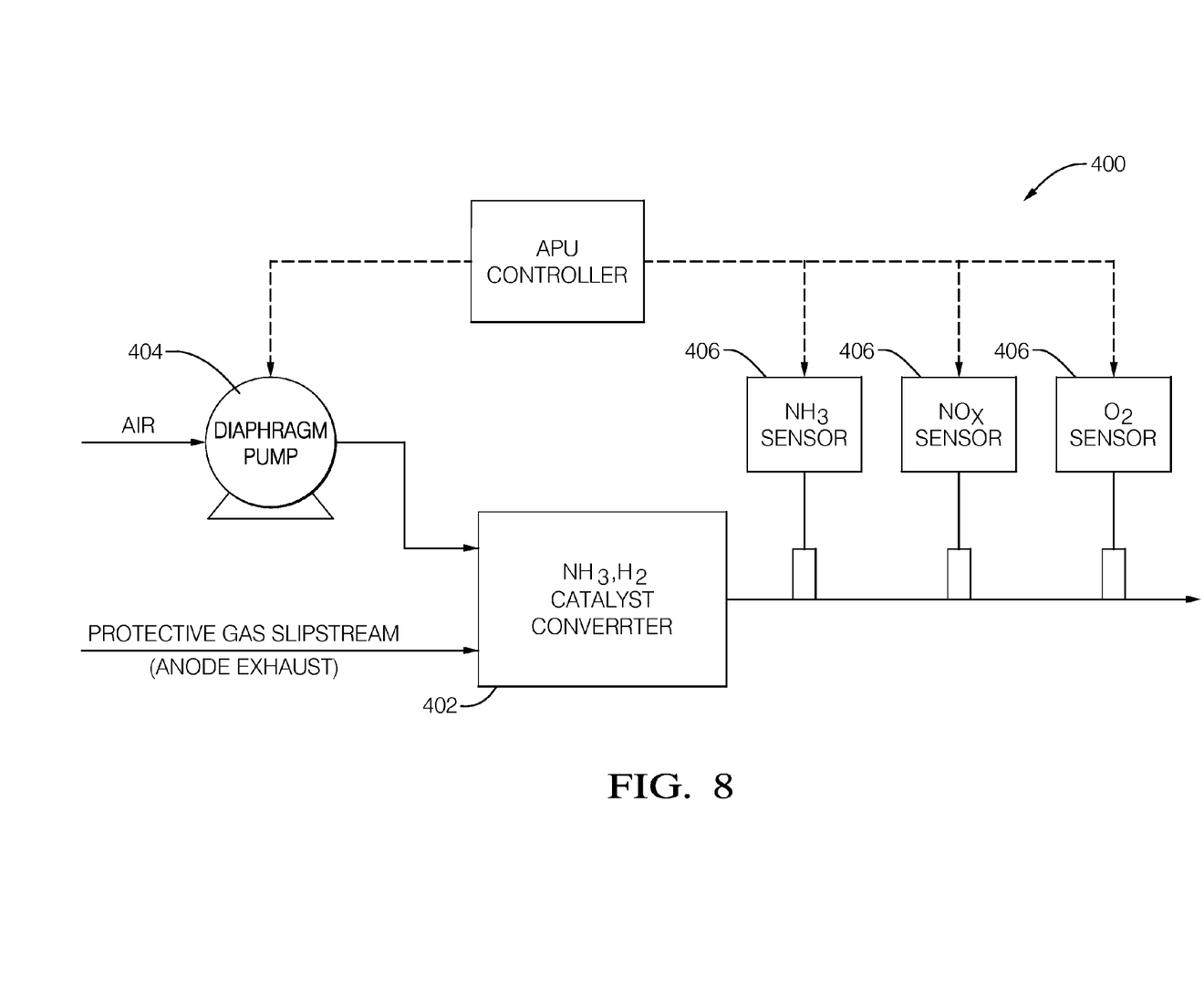
FIG. 8 shows a Post Combustion and Slip Stream Control Subsystem.

While injecting reducing gas into the SOFC system 1 during APU system shut down, there is the potential for the reducing gas to exit the check valve 304. The reducing gas exiting the check valve is known as a slip stream. Shown in FIG. 8 is a post combustion and slip stream control subsystem 400 designed to treat the discharge of this slip stream. The system includes a catalyst converter 402 optionally heated by an electric resistive heater. An air supply means, such as a diaphragm pump 404, variable orifice or a variable venturi is used to control air flow to the converter for the lean or near stoichmetric post-combustion of the waste gas. The injection point of air can be in front of the stack, which helps stack cooling, as well as reduce APS material consumption. One or more optional sensors 406 such as an ammonia sensor or optional NOx sensor or optional $O_2$ sensor, at the gas exit to monitor the combustion process, and the signal is fed back to control air supply. This is to ensure essentially no ammonia and hydrogen gas remains from the discharge gas, as well as not to create NOx during hydrogen combustion process. As slip stream gas pass through a hot catalyst converter 402, any ammonia leftover in the reducing gas is converted into hydrogen and nitrogen gas, and hydrogen is combusted through the catalyst to form steam.

While this invention has been described in terms of the preferred embodiments thereof, it is not intended to be so limited, but rather only to the extent set forth in the claims that follow.

The invention claimed is:

1. An anode protection system (APS) for a fuel cell system having a fuel cell stack formed of a plurality of solid oxide fuel cells, wherein each solid oxide fuel cell includes an anode layer, said APS comprises of:
   a reductant supply and safety subsystem having:
      means for generating a reducing gas;
      means for passing the reducing gas over the anode layer during the shutdown or standby operation of the fuel cell stack; and
      means for controlling a flow of the reducing gas over the anode layer,
   said reducing gas is ammonia;
   said means for generating said reducing gas includes decomposing an ammonia containing material into said ammonia gas and a carbon dioxide gas.

2. The APS of claim 1, wherein said ammonia containing material is liquid anhydrous ammonia.

3. The APS of claim 2, wherein said means for generating said reducing gas includes a double walled storage cylinder.

4. The APS of claim 3, further including:
   an ammonia absorption material surrounding said double walled storage cylinder; and
   a container housing said double walled storage cylinder and said ammonia absorption material.

5. The APS of claim 3, wherein said means for controlling a flow of the reducing gas over the anode layer includes:
   an electrically actuated valve configured for opening and closing a gas outlet of said double walled storage cylinder;
   a flow control valve configured to control the flow rate of the ammonia gas from said double walled storage cylinder to the anode layer; and
   a pressure regulator configured to regulate the pressure of the ammonia gas from said double walled storage cylinder to the anode layer.

6. The APS of claim 1, wherein said ammonia containing material is an ammonia-related compound selected from a group consisting of ammonium carbamate, ammonium carbonate, urea, and guanidine.

7. The APS of claim 6, wherein said ammonium carbamate is compressed into a solid cartridge having an effective density such that said ammonium carbamate sublimates at a temperature above about 60° C. to produce an ammonia gas and a carbon dioxide gas.

8. The APS of claim 7, wherein said means for generating said reducing gas includes an electric resistance heater configured to heat said solid cartridge of said ammonium carbamate to a temperature above about 60° C.

9. The APS of claim 8, further including a heater to heat said ammonia gas and said carbon dioxide gas to prevent re-solidification of said ammonia gas and said carbon dioxide.

10. The APS of claim 1, wherein said means for generating said reducing gas includes an ammonia containing material comprising a metal ammine salt complex having an alkali earth or transition metal, wherein said metal ammine salt complex is formulated to reversibly store and release ammonia with a change in temperature or pressure.

11. The APS of claim 1, wherein said means for generating said reducing gas includes an ammonia containing material comprising a compound formulated to store ammonia by absorption.

12. The APS of claim 11, wherein said compound is selected from a group consisting of calcium chloride, strontium chloride, and magnesium chloride.

13. The APS of claim 1 further comprising a SOFC anode protection system having means for providing a reducing gas to the anode layer to produce an internal pressure of 0.2 to 10 kPa in the SOFC stack A.

14. The APS of claim 1 further comprising a post combustion and anode slip control subsystem having a catalyst converter configured to treat any residual reducing gas in the slip stream gas exiting from SOFC stack.

15. The APS of claim 14, wherein said post combustion and anode slip control subsystem includes an air pump configured to deliver air to the fuel cell to accelerate cooling of the fuel cell and to increase oxygen into the slip stream gas to heat and dilute the slip stream gas, thereby preventing re-solidification of any residual reducing gas.

16. The APS of claim 1 further comprising:
a SOFC anode protection system having means for providing a reducing gas to the anode layer to produce an internal pressure of 0.2 to 10 kPa in the SOFC stack; and
a post combustion and anode slip control subsystem having a catalyst configured to treat any residual reducing gas in the slip stream gas exiting from SOFC stack.

* * * * *